(12) United States Patent
Hsu

(10) Patent No.: US 7,636,207 B2
(45) Date of Patent: Dec. 22, 2009

(54) LENS SYSTEM

(75) Inventor: Te-Lun Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/940,905

(22) Filed: Nov. 15, 2007

(65) Prior Publication Data

US 2009/0046378 A1 Feb. 19, 2009

(30) Foreign Application Priority Data

Aug. 17, 2007 (CN) .................... 2007 1 0201388

(51) Int. Cl.
*G02B 9/12* (2006.01)
(52) U.S. Cl. .................................. 359/791
(58) Field of Classification Search ............. 359/689, 359/716, 784, 791
See application file for complete search history.

(56) References Cited

U.S. PATENT DOCUMENTS 5,808,815 A 9/1998 Kouthoofd
6,795,253 B2 9/2004 Shinohara
2005/0002119 A1* 1/2005 Nakamura .................. 359/791
2007/0109668 A1* 5/2007 Isono ........................ 359/791

FOREIGN PATENT DOCUMENTS

CN 1677153 A 10/2005

OTHER PUBLICATIONS

DA Zhou. A new method of blacking the edge of the optical element Optics, Mechanics & Electronics Information, Aug. 1996, vol. 13, No. 8, pp. 27-28, The Chinese Optical Society, No. 3888 Dong nanhu Road. Changchun, 130033,China.

* cited by examiner

*Primary Examiner*—Alicia M Harrington
(74) *Attorney, Agent, or Firm*—Zhigang Ma

(57) ABSTRACT

A lens system includes a positive refractive power first lens, a positive refractive power second lens, and a negative refractive power third lens in that order from the object side of the lens system. Wherein the lens system satisfies the following conditions: (1) 0.25<R1F/F<0.5; (2) R2F<R2R<0; and (3) 0<R1F<R1R, wherein R1R and R1F are radius of curvature of object side surface and image side surface of the first lens respectively, R2R and R2F are radius of curvature of object side surface and image side surface of the second lens respectively, and F is a focal length of the lens system.

9 Claims, 7 Drawing Sheets

LENS SYSTEM

TECHNICAL FIELD

The present invention relates to a lens system and, particularly, to a compact lens system having a small number of lens components and a short overall length.

DESCRIPTION OF RELATED ART

Conventionally, there is a technical field of lenses where a short overall length is demanded for use in lens modules for image acquisition that are mounted in relatively thin equipment, such as simple digital cameras, webcams for personal computers, and portable imaging systems in general. In order to satisfy this demand, previous imaging lenses have been formed using a one-piece lens construction. Because the electronic image sensing chips previously used with the lens modules were compact and had low resolution, maintaining a small image size on the image sensing chips and miniaturizing the lens systems with a small number of lens components was a priority. In previous arrangements, even with one-piece lens construction, aberrations were acceptable and the incident angle of light rays onto the image sensing chip was not so large as to be a problem.

However, in recent years, because the resolution and the size of the image sensing chips have increased, aberrations occurring in one-piece lenses are too large to achieve the desired optical performance. Therefore, it has become necessary to develop a lens system with a short overall length and with an optical performance that matches image sensing chips having enhanced resolution and size.

What is needed, therefore, is a lens system with a short overall length and with relatively good optical performance.

SUMMARY

In accordance with one present embodiment, a lens system includes a positive refractive power first lens, a positive refractive power second lens, and a negative refractive power third lens in that order from the object side of the lens system. Wherein the lens system satisfies the following conditions:

$$0.25 < R1F/F < 0.5; \quad (1)$$

$$R2F < R2R < 0; \text{ and} \quad (2)$$

$$0 < R1F < R1R, \quad (3)$$

wherein, R1R is the radius of curvature of a surface of the first lens facing the image side of the lens system, R1F is the radius of curvature of the surface of the first lens facing the object side of the lens system, R2R is the radius of curvature of a surface of the second lens facing the image side of the lens system, R2F is the radius of curvature of the surface of the second lens facing the object side of the lens system, and F is a focal length of the lens system.

BRIEF DESCRIPTION OF THE DRAWING

Many aspects of the present lens system can be better understood with reference to the following drawings. The components in the drawing are not necessarily drawn to scale, the emphasis instead being placed upon clearly illustrating the principles of the present lens system. Moreover, in the drawings, like reference numerals designate corresponding parts throughout the several views.

DETAILED DESCRIPTION OF THE EMBODIMENTS

Embodiments will now be described in detail below, with reference to the drawings.

Figure 1:
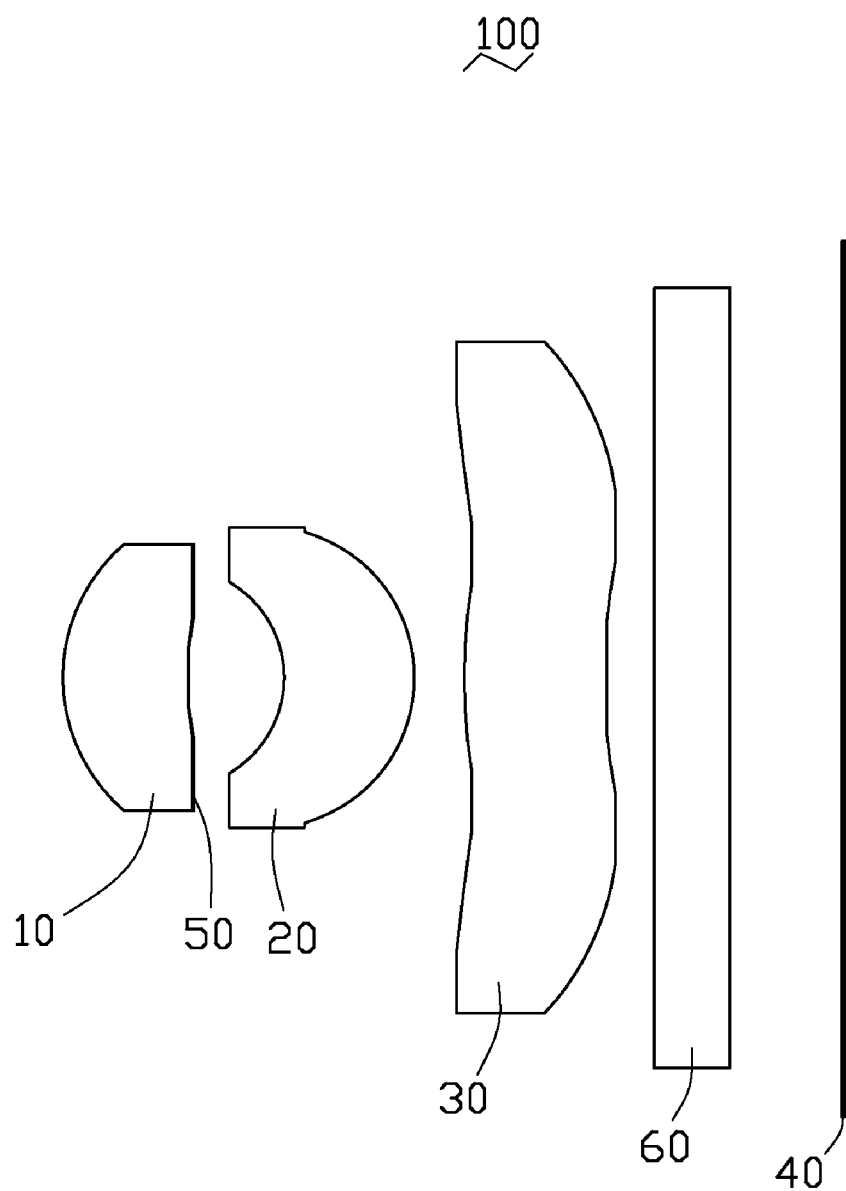
FIG. 1 is a schematic view of a lens system in accordance with an embodiment.

Referring to FIG. 1, a lens system 100, according to an embodiment, is shown. The lens system 100 includes a positive refractive power first lens 10, a positive refractive power second lens 20, and a negative refractive power third lens 30 in that order from the object side of the lens system 100. The lens system 100 can be used in digital cameras, mobile phones, personal computer cameras and so on. The lens system 100 can be used for capturing images by disposing an image sensor at an image plane 40 of the lens system 100.

In order that the lens system 100 has a short overall length and excellent optical performance, the lens system 100 satisfies the following conditions:

$$0.25 < R1F/F < 0.5; \quad (1)$$

$$R2F < R2R < 0; \text{ and} \quad (2)$$

$$0 < R1F < R1R, \quad (3)$$

wherein, R1R is the radius of curvature of a surface of the first lens 10 facing the image side of the lens system 100, R1F is the radius of curvature of the surface of the first lens 10 facing the object side of the lens system 100, R2R is the radius of curvature of a surface of the second lens 20 facing the image side of the lens system 100, R2F is the radius of curvature of the surface of the second lens 20 facing the object side of the lens system 100, and F is a focal length of the lens system 100. The first condition (1) is for limiting the overall length of the lens system 100. If the value of the R1F/F is bigger than 0.5, the lens system 100 cannot achieve a short overall length. If the value of the R1F/F is smaller than 0.25, the field curvature and spherical aberration caused by the first lens 10 will be difficult to compensate for. The second condition (2), is for limiting the direction of the second lens 20 in the lens system 100 in order to compensate lateral chromatic aberration, spherical aberration and coma caused by the first lens 10. The third condition (3) is for limiting the overall length of the lens system 100 and making the first lens 10 having a positive refractive power for compensating aberrations caused by the third lens 30. In the present embodiment, the first lens 10 is a meniscus-shaped lens with a convex surface facing the object side of the lens system 100. Preferably, the two surfaces of the first lens 10 are aspherical. The second lens 20 is a meniscus-shaped lens with a convex surface facing the image side of the lens system 100. Preferably, the two surfaces of the second lens 20 are aspherical.

Preferably, the first lens 10 also satisfies the following condition:

$$0.3 < (R1R - R1F)/(R1F + R1R), \quad (4)$$

The fourth condition (4) is for limiting the relationship between the radius of curvature of two surfaces of the first lens 10 in order to correct distortion and astigmation of the lens system 100.

Preferably, the lens system 100 also satisfies the following condition:

$$R3F > 0; \quad (5)$$

$$0.7 < F1/F < 1.5, \quad (6)$$

wherein, R3F is the radius of curvature of the surface of the third lens 30 facing the object side of the lens system 100, and F1 is a focal length of the first lens 10. Conditions (5) and (6) together limit the incident angle of the incident light on the image plane 40 to less than 25° and also can correct distortion of the lens system 100. Further, the sixth condition (6) is for correcting many types of aberrations, especially spherical aberration, of the lens system 100 and limiting the overall length of the lens system 100. If the value of the F1/F is bigger than 1.5, the refractive power of the first lens 10 will be too small and the distortion of the lens system 100 will be difficult to correct. The third lens 30 is a meniscus-shaped lens with a convex surface facing the object side of the lens system 100. Preferably, the two surfaces of the third lens 30 are aspherical.

Also, in order to appropriately correct the chromatic aberration of the lens system 100, the Abbe constant v2 of the second lens 20 preferably satisfies the following condition:

$$45 < v2 < 60. \quad (7)$$

The lens system 100 further includes an aperture stop 50 and a infrared filter 60. The aperture stop 50 is arranged between the first lens 10 and the second lens 20 in order to reduce light flux into the second lens 20. For further cost reduction, the aperture stop 50 is preferably formed directly on the surface of the first lens 10 facing the image side of the lens system 100. In practice, a portion of the surface of the first lens 10 through which light rays should not be transmitted is coated with an opaque material, such as black material, which functions as the aperture stop 50. The infrared filter 60 is arranged between the third lens 30 and the image plane 40 for filtering infrared rays coming into the lens system 100.

Further, the first lens 10, the second lens 20, and the third lens 30 can be made from a resin or a plastic, which makes their manufacture relatively easy and inexpensive.

Examples of the system will be described below with reference to FIGS. 2-7. It is to be understood that the invention is not limited to these examples. The following are symbols used in each exemplary embodiment.

FNo: F number
2ω: field angle
R: radius of curvature
d: distance between surfaces on the optical axis of the system
Nd: refractive index of lens
v: Abbe constant In each example, both surfaces of the first lens 10, both surfaces of the second lens 20, and both surfaces of the third lens 30 are aspheric. The shape of each aspheric surface is determined by expression 1 below. Expression 1 is based on a Cartesian coordinate system, with the vertex of the surface being the origin, and the optical axis extending from the vertex being the x-axis.

$$x = \frac{ch^2}{1 + \sqrt{1 - (k+1)c^2h^2}} + \sum A_i h^i \qquad \text{Expression 1}$$

wherein, h is a height from the optical axis to the surface, c is a vertex curvature, k is a conic constant, and $A_i$ are i-th order correction coefficients of the aspheric surfaces.

EXAMPLE 1

Tables 1 and 2 show lens data of Example 1.

TABLE 1

| Lens system 100 | R (mm) | d (mm) | Nd | v |
|---|---|---|---|---|
| Object side surface of the first lens 10 | 1.142824 | 0.663186 | 1.54 | 56 |
| Image side surface of the first lens 10 | 2.897551 | 0.04947936 | 1.54 | 56 |
| Aperture stop 50 | infinite | 0.6687439 | | |
| Object side surface of the second lens 20 | −1.20516 | 0.8278974 | 1.53 | 56 |
| Image side surface of the second lens 20 | −0.81768 | 0.1 | 1.53 | 56 |
| Object side surface of the third lens 30 | 14.01444 | 0.5215678 | 1.53 | 56 |
| Image side surface of the third lens 30 | 1.369028 | 0.15 | 1.53 | 56 |
| Object side surface of the infrared filter 60 | infinite | 0.3 | 1.5168 | 64.16734 |
| Image side surface of the infrared filter 60 | Infinite | 0.41415 | 1.5168 | 64.16734 |

TABLE 2

| | Surface | | | | | |
|---|---|---|---|---|---|---|
| | Object side surface of the first lens 10 | Image side surface of the first lens 10 | Object side surface of the second lens 20 | Image side surface of the second lens 20 | Object side surface of the third lens 30 | Image side surface of the third lens 30 |
| Aspherical coefficient | A2 = 0.5734400<br>A4 = −0.038082183<br>A6 = 0.26617946<br>A8 = −0.27003972<br>A10 = 0.47036051<br>A12 = −0.4519263 | A2 = 10.20508<br>A4 = −0.01524513<br>A6 = 0.17622633<br>A8 = −1.138302<br>A10 = 1.8438515<br>A12 = 2.6236165 | A2 = 0.6121418<br>A4 = −0.19334272<br>A6 = −0.71128885<br>A8 = 0.46720762<br>A10 = −1.3879106<br>A12 = 0.32719325 | A2 = −0.4658288<br>A4 = 0.095586872<br>A6 = −0.003293142<br>A8 = −0.005742858<br>A10 = −0.17914532<br>A12 = 0.26183762 | A2 = −6687.413<br>A4 = −0.24715187<br>A6 = 0.1682316<br>A8 = −0.04475158$$<br>A10 = 0.004060038<br>A12 = 0.000101020 | A2 = −10.4658<br>A4 = −0.16668525<br>A6 = 0.076842457<br>A8 = −0.28162178<br>A10 = 0.005731356<br>A12 = −0.000483753 |

Figure 2:
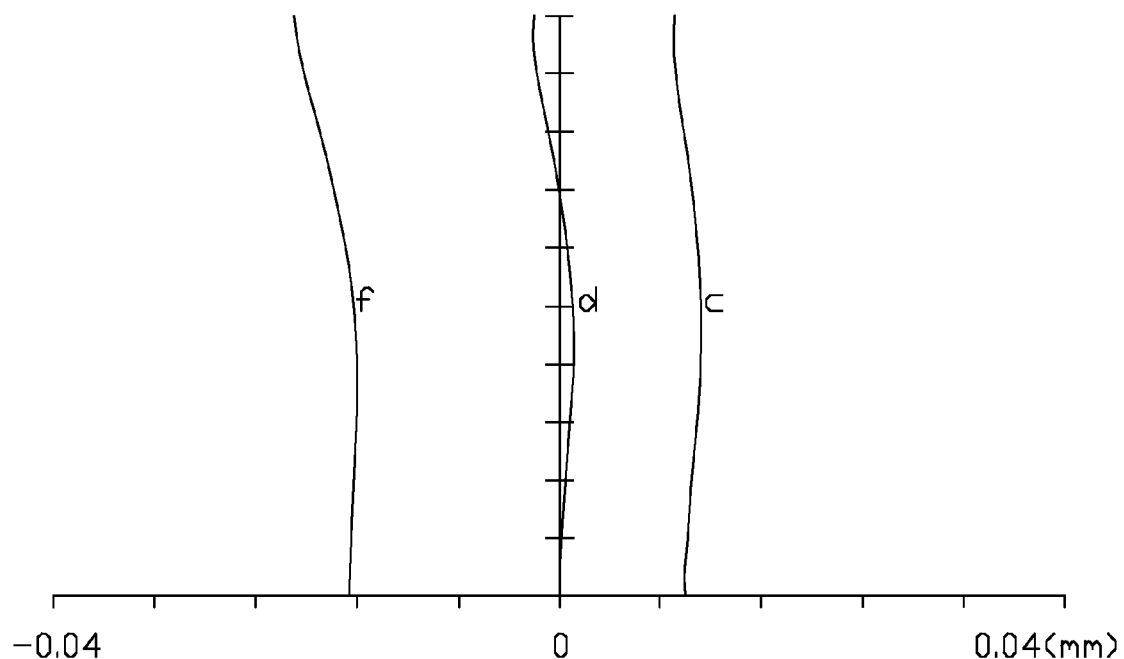
FIGS. 2-4 are graphs respectively showing spherical aberration, field curvature and distortion for a lens system in accordance with a first exemplary embodiment of the present invention.
Figure 3:
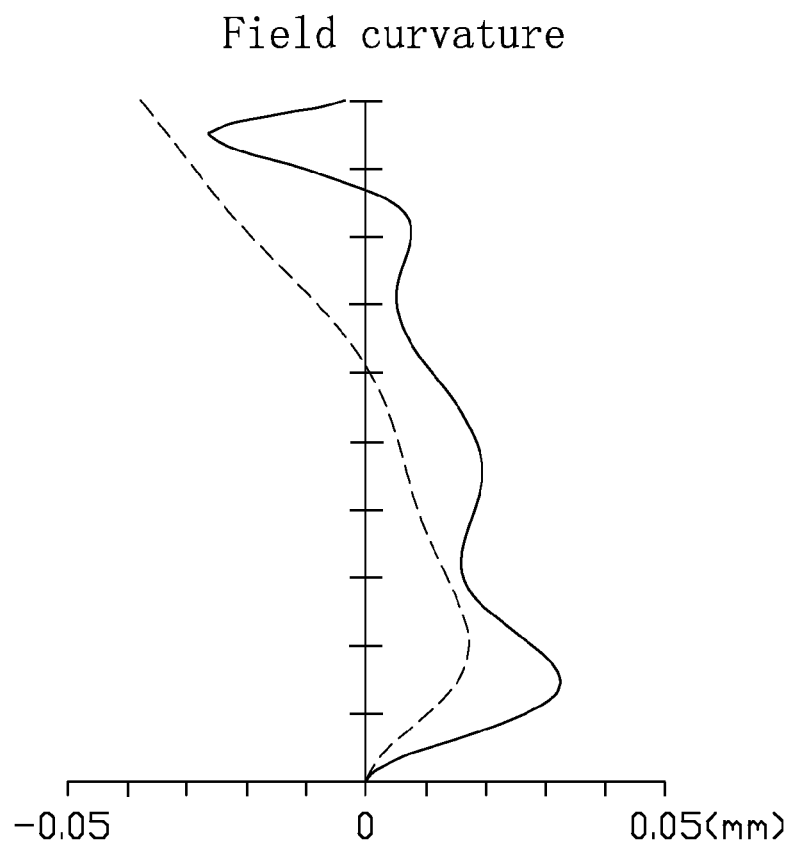
Figure 4:
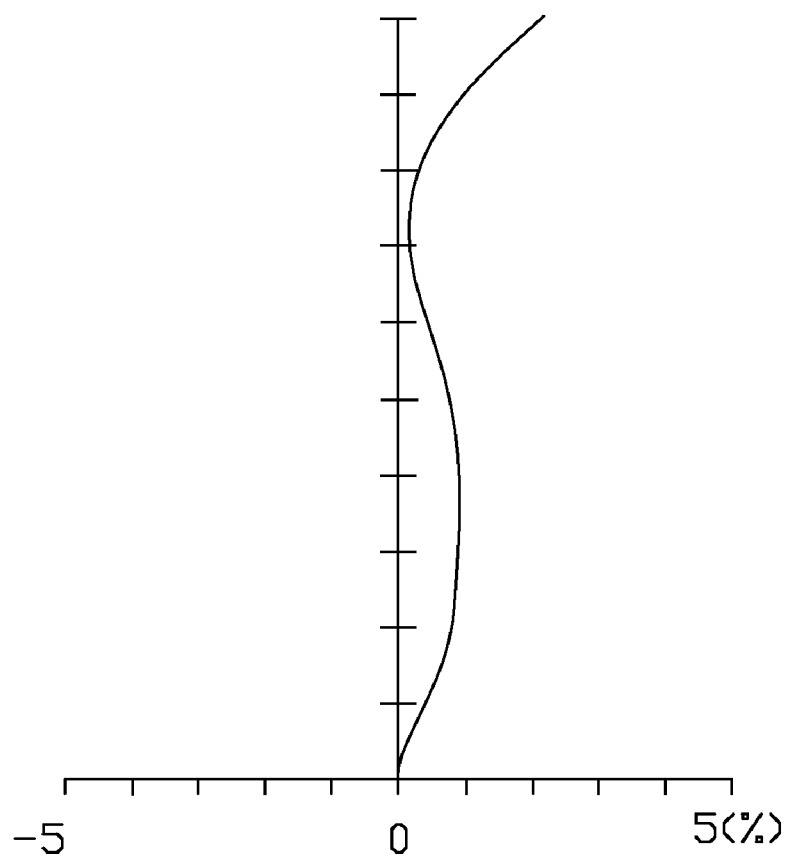

FIGS. 2-4 are graphs of aberrations (spherical aberration, field curvature, and distortion) of the lens system 100 of Example 1. In FIG. 2, the curves c, d, and f show spherical aberration of the lens system 100 corresponding to three types of light with wavelengths of 656.3 nm, 587.6 nm, and 435.8 nm respectively. Generally, the spherical aberration of lens system 100 is limited to a range from −0.04 mm to 0.04 mm, the field curvature of the lens system 100 is limited to a range from −0.05 mm to 0.05 mm, and the distortion of the lens system 100 is limited to a range from −5% to 5%.

EXAMPLE 2

Tables 3 and 4 show lens data of Example 2.

TABLE 3

| Lens system 100 | R (mm) | d (mm) | Nd | ν |
|---|---|---|---|---|
| Object side surface of the first lens 10 | 0.956381 | 0.704587 | 1.54 | 56 |
| Image side surface of the first lens 10 | 1.847207 | 0.5423625 | 1.54 | 56 |
| Object side surface of the second lens 20 | −1.2 | 0.8836055 | 1.53 | 56 |
| Image side surface of the second lens 20 | −0.96075 | 0.1 | 1.53 | 56 |
| Object side surface of the third lens 30 | −11.7461 | 0.7269722 | 1.53 | 56 |
| Image side surface of the third lens 30 | 2.645506 | 0.1 | 1.53 | 56 |
| Object side surface of the infrared filter 60 | infinite | 0.3 | 1.5168 | 64.16734 |
| Image side surface of the infrared filter 60 | Infinite | 0.2800699 | 1.5168 | 64.16734 |

TABLE 4

| | Surface | | | | | |
|---|---|---|---|---|---|---|
| | Object side surface of the first lens 10 | Image side surface of the first lens 10 | Object side surface of the second lens 20 | Image side surface of the second lens 20 | Object side surface of the third lens 30 | Image side surface of the third lens 30 |
| Aspherical coefficient | A2 = 0.358382<br>A4 = −0.03347<br>A6 = 0.074825<br>A8 = −0.39767<br>A10 = 0.761948<br>A12 = −0.73374 | A2 = 9.366716<br>A4 = −0.02345<br>A6 = 0.11491001<br>A8 = −1.50568<br>A10 = 2.34376315<br>A12 = 2.133353 | A2 = 1.925198<br>A4 = −0.19579<br>A6 = −0.0830489<br>A8 = −0.94961<br>A10 = 0.813157<br>A12 = −1.146362 | A2 = −0.6564744<br>A4 = −0.02902<br>A6 = 0.03712748<br>A8 = −0.06658<br>A10 = −0.01564<br>A12 = 0.053667 | A2 = −103.1109<br>A4 = −0.15472<br>A6 = 0.12202466<br>A8 = −0.0393<br>A10 = 0.005499<br>A12 = −0.00025 | A2 = −16.08475<br>A4 = −0.11998<br>A6 = 0.03396535<br>A8 = −0.00901<br>A10 = 0.001836<br>A12 = −0.00021 |

Figure 5:
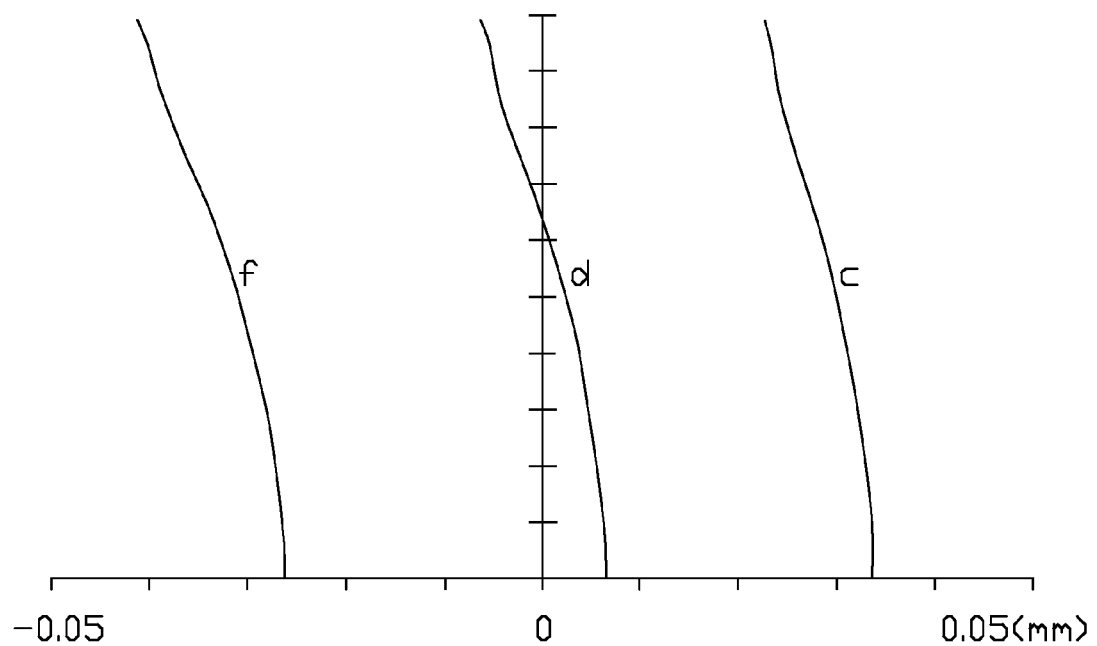
FIGS. 5-7 are graphs respectively showing spherical aberration, field curvature and distortion for a lens system in accordance with a second exemplary embodiment of the present invention.
Figure 6:
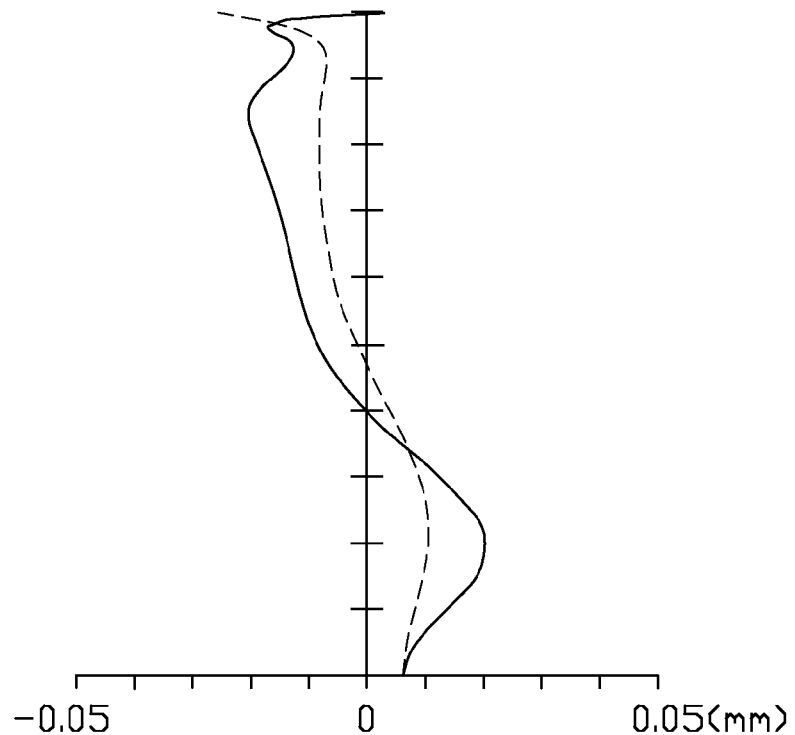
Figure 7:
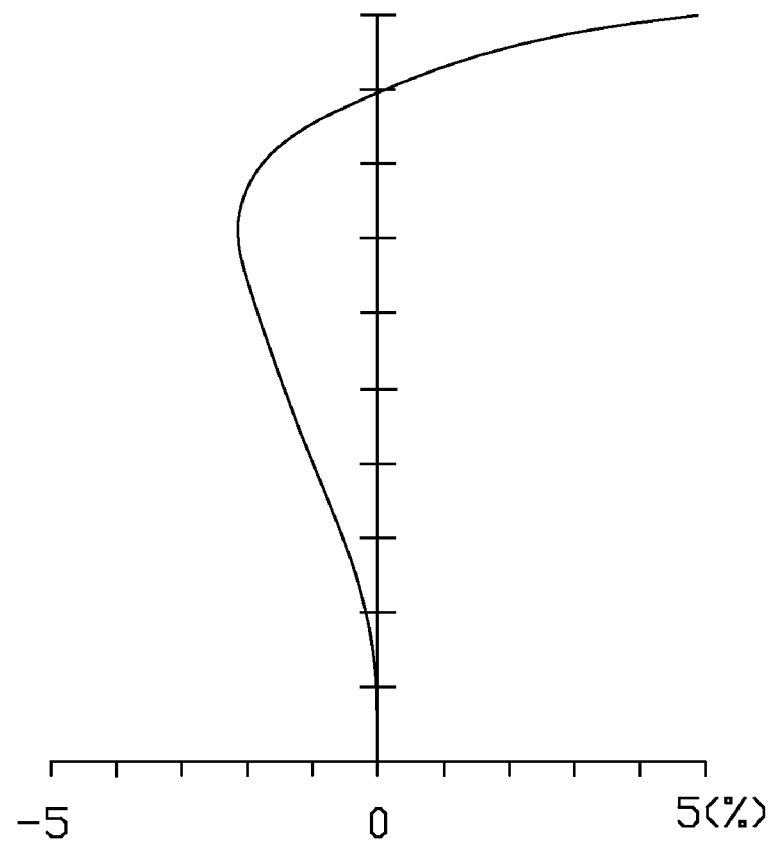

FIGS. 5-7 are graphs of aberrations (spherical aberration, field curvature, and distortion) of the lens system 100 of Example 1. In FIG. 5, the curve c, d, and f show spherical aberration of the lens system 100 corresponding to three types of light with wavelengths of 656.3 nm, 587.6 nm, and 435.8 nm respectively. Generally, the spherical aberration of lens system 100 is limited to a range from −0.04 mm to 0.04 mm, the field curvature of the lens system 100 is limited to a range from −0.05 mm to 0.05 mm, and the distortion of the lens system 100 is limited to a range from −5% to 5%.

As seen in the above-described examples, the distortion of the lens system 100 can also be limited to a range from −5% to 5% when keeping the field angle of the lens system bigger than 60°. The overall length of the lens system 100 is small, and the system 100 appropriately corrects fundamental aberrations.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens system comprising, in order from the object side:
   a positive refractive power first lens;
   a positive refractive power second lens; and
   a negative refractive power third lens, the third lens being a meniscus-shaped lens with a convex surface facing the object side of the lens system, wherein the lens system satisfies the following conditions:

$0.25 < R1F/F < 0.5$ (1);

$R2F < R2R < 0$ (2);

$0 < R1F < R1R$ (3);

$R3F > 0$ (4);

$0.7 < F1/F < 1.5$ (5); and $45 < v2 < 60$, wherein, R1R is the radius of curvature of a surface of the first lens facing the image side of the lens system, R1F is the radius of curvature of the surface of the first lens facing the object side of the lens system, R2R is the radius of curvature of a surface of the second lens facing the image side of the lens system, R2F is the radius of curvature of the surface of the second lens facing the object side of the lens system, R3F is the radius of curvature of the surface of the third lens facing the object side of the lens system, F1 is a focal length of the first lens, F the focal length of the lens system, and v2 is the Abbe constant of the second lens.

2. The lens system as claimed in claim 1, wherein the following condition is satisfied: $0.3 < (R1R - R1F)/(R1F + R1R)$.

3. The lens system as claimed in claim 1, wherein the lens system comprises an aperture stop arranged between the first lens and the second lens.

4. The lens system as claimed in claim 1, wherein the aperture stop is formed directly on the surface of the first lens facing the image side of the lens system.

5. The lens system as claimed in claim 4, wherein the aperture stop is formed by coating a peripheral portion of the surface of the first lens using an opaque material.

6. The lens system as claimed in claim 1, wherein the lens system further comprises an infrared filter arranged between the third lens and the image plane.

7. The lens system as claimed in claim 1, wherein the first lens is a meniscus-shaped lens with a convex surface facing the object side of the lens system.

8. The lens system as claimed in claim 1, wherein the second lens is a meniscus-shaped lens with a convex surface facing the image side of the lens system.

9. The lens system as claimed in claim 1, wherein each of the first lens, the second lens, and the third lens is an aspherical lens.

* * * * *